Nov. 9, 1937.    A. B. JUHASZ    2,098,663
LIQUID PASTEURIZING APPARATUS
Filed April 23, 1936
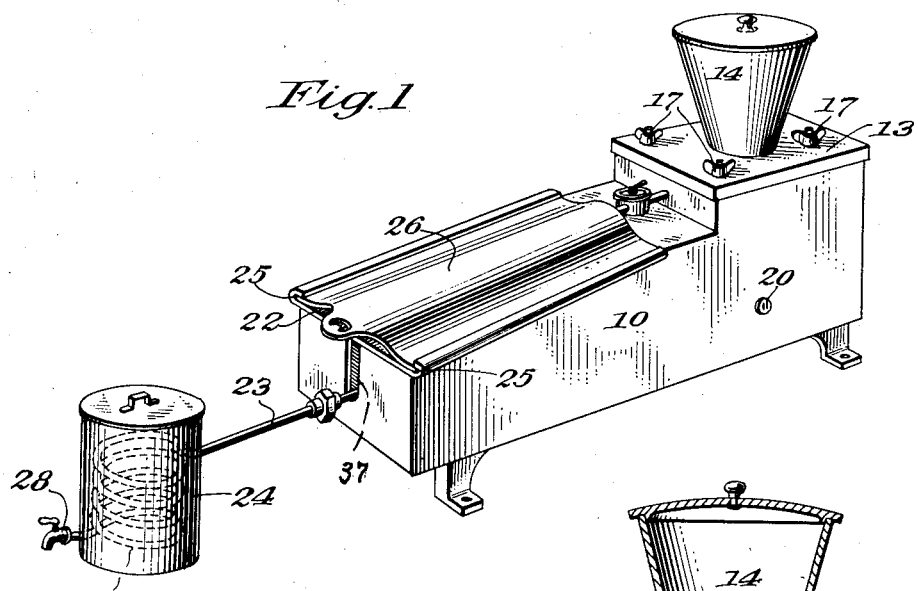
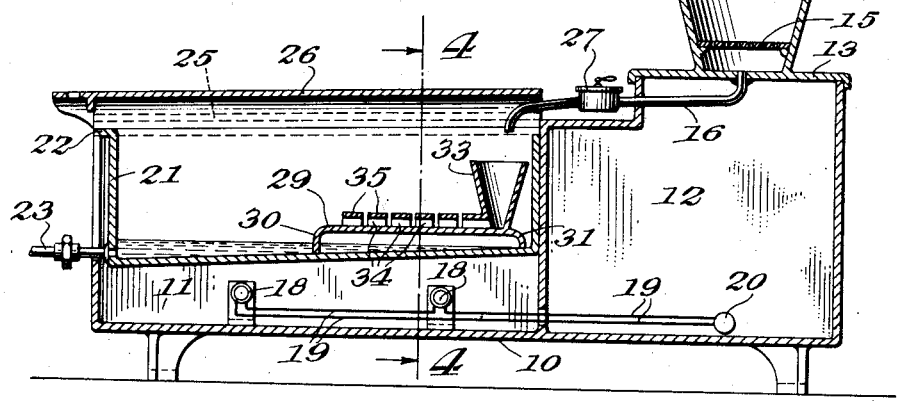
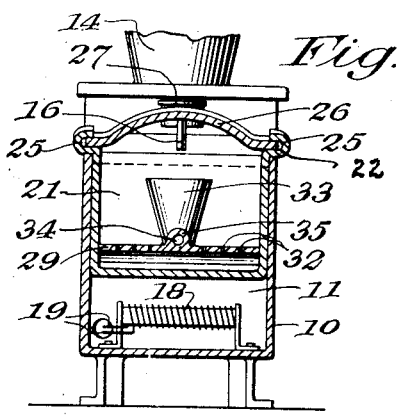
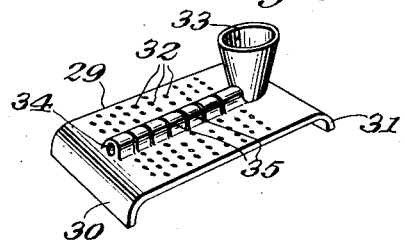
INVENTOR
Andrew B. Juhasz
BY
C. M. Newman
ATTORNEY Patented Nov. 9, 1937

2,098,663

UNITED STATES PATENT OFFICE 2,098,663

LIQUID PASTEURIZING APPARATUS

Andrew B. Juhasz, Norwalk, Conn.

Application April 23, 1936, Serial No. 76,014

4 Claims. (Cl. 219—38)

My invention relates to new and useful improvements in apparatuses for pasteurizing and cooling liquids, such, for instance, as milk.

An object of my invention is to provide an electrically heated pasteurizing apparatus whereby liquid may be pasteurized as it flows through the machine and whereby the flow as well as the electric current may be delicately adjusted to insure the required degree of heat and the extent of the pasteurization.

The apparatus as designed is relatively simple in construction and is adapted to be made in different sizes so as to accommodate individual dairymen, having a few cows, and likewise when built in larger sizes is adapted to be used to equal advantage by a large dairy or distributor, who buys raw milk in quantities and pasteurizes it preparatory to delivery to customers.

A further object of the invention is to provide an apparatus wherein the raw milk, upon entering the machine, is thoroughly broken up and circulated in a pan beneath which one or more electric heating units are positioned, and further to provide pipe connections from the pan to a cooler whereby the pasteurized milk may be cooled as it is run from the apparatus.

The invention further consists in structural details and arrangement of parts which insures important advantages and renders the device less expensive to manufacture and otherwise more convenient for use, as will be hereinafter more fully set forth.

In the accompanying drawing, I have illustrated what I now consider to be the preferred form of an embodiment of my invention, and in the drawing:

Fig. 1 shows a perspective view of my pasteurizing and cooling apparatus in position as in use.

Fig. 2 is a longitudinal section of the apparatus shown in Fig. 1, minus the cooling unit.

Fig. 3 is a detached perspective view of the distributing unit positioned in the tank to receive and distribute the milk preparatory to being heated and Fig. 4 shows a cross section taken on line 4—4 of Fig. 2 looking in the direction of the arrow.

Referring in detail to the drawing and characters of reference marked thereon 10 represents a base or casing including a bottom, side and end walls and a partition wall which latter divides the casing into two compartments 11 and 12. The compartment 12 is provided with a removable cover 13 upon which a hopper 14 to receive the milk is positioned and provided with a suitable strainer 15 through which the milk passes from the hopper to the pipe 16 that conveys it into the pasteurizing chamber proper. The cover 13 may be secured to the casing in any suitable manner as for instance by clamping screw 17 as shown in Fig. 1. 18—18 represent heating units suitably installed in the lower portion of the receptacle 11 and which is connected by wires 19 with the plug 20, see Figs. 1 and 2.

A removable pan 21 of suitable size and proportion is positioned in the chamber 11. The top edge is preferably flanged as at 22 so as to rest upon the top edge of the casing and may be suitably supported in the chamber 11 of said casings. The bottom of this pan is formed on a slight angle so as to insure drainage of liquid therefrom out through the pipe 23 to the cooler 24. The upper edge portion of the pan, see Fig. 4, is provided along its parallel top side edges with suitable guide ways 25 to receive the opposite edges of the cover 26 which may be slid in from the rear end so as to cover the pan, but not entirely inclose it, since the end portions of the cover are preferably left open to permit the steam and vapors arising from the heated milk to escape. The pipe 16 is provided with a suitable valve 27 whereby the flow of milk from the hopper 14 may be properly regulated. The pipe 23 which leads to the cooler is also provided with a suitable valve 28 whereby the flow of heated milk therefrom may also be regulated.

Within the removable pan 21 I provide a distributor 29 which, as will be seen, is formed in part of sheet metal, having its two end portions 30 and 31 deflected downward to engage the bottom of the pan to support the same in spaced relation to the bottom of the pan. 33 indicates a funnel into which the milk from the pipe 16 is discharged. This funnel has an opening in one side which registers with the aligned openings 34 in the spaced apart aligned pipe sections 35 forming part of the top of the distributor so that as the milk flows from the funnel through the pipe sections it will emerge through the openings between the adjacent ends of said pipe sections. The distributor is further provided with suitable perforations 32 whereby milk flowing from the openings 34 in the pipe sections will spread over the surface of the distributor, be broken up and sprinkle down into the pan. The milk thus builds up in the pan more or less, and as the heat rises against the under surface of the pan from the electric heating units, the milk becomes heated to the degree required and then permitted to run off through the pipe 23 into the cooler.

From the foregoing described construction it will readily be seen that by proper regulation of the valve in the inlet pipe, the flow of liquid to the machine may be properly regulated so that the quantity within the pan may be maintained at a suitable pasteurizing temperature. The cooler 24 which can be packed with ice may be of sufficient size to insure proper cooling of the milk to the required temperature, and that by reason of the drain cock 35 attached to the milk coil 36 within the cooler 24, the pasteurized and cooled milk can be drawn off and bottled very conveniently.

From the foregoing it will be seen that my apparatus is not only compact, durable and practical but is also constructed so as to be readily disassembled as for cleaning. In this respect it will be seen that the hopper 14 and the cover 13 can readily be removed by disconnecting the nuts 17. The cover 26 can likewise be removed by sliding it out from the guide ways 25 whereupon the distributor may be lifted out and then the pan 21. The cooler can likewise be detached by disconnecting the coupling of the pipe 23. The slot 37 in the end of the casing permits the short lengths of pipe attached to the pan to be raised along with the pan when it is taken out of the casing. The parts when so disconnected can be readily washed, cleaned, aired and dried so as to fully meet all requirements.

Having thus described my invention what I claim and desire to secure by Letters Patent is:

1. A pasteurizing apparatus of the class described comprising a heating chamber including an electric heating unit, a liquid receptacle movably supported in said chamber, a removable distributing unit comprising a perforated base supported in spaced relation to the bottom of the receptacle and including a funnel to receive the liquid, and means for supplying liquid to the distributing unit.

2. An apparatus for pasteurizing liquid comprising a heating chamber, an electric heating unit, a liquid receptacle supported within the chamber, a removable distributing unit within the receptacle to receive the liquid from an inlet pipe and to distribute the liquid over the perforated surface of the unit, a removable cover for said receptacle, means for containing liquid to be pasteurized and having a pipe connection therefrom to the distributing unit, and a regulating valve within the pipe.

3. A pasteurizing apparatus, comprising a hopper to receive liquid, a heating chamber, a liquid containing receptacle, a distributor supported in spaced relation to the bottom of the receptacle and including a perforated member having a series of aligned short pipe sections mounted thereon to receive the liquid from the hopper and to distribute it upon the surface of the perforated member, means for regulating the supply of liquid to the apparatus and means for drawing it off.

4. A pasteurizing apparatus comprising a heating chamber, a liquid containing pan removably supported therein and having a cover, an electric heating unit in the chamber below the liquid containing pan, a receptacle for containing liquid to be pasteurized and having a pipe connection to the liquid pan, a removable perforated distributing unit positioned beneath said pan and in spaced relation to the bottom of the pan said distributor having means in association with the intake supply pipe for directing the incoming stream of liquid over opposite portions of the length of the surface of the distributor.

ANDREW B. JUHASZ.